(12) United States Patent
Ferrari et al.

(10) Patent No.: US 7,128,506 B2
(45) Date of Patent: Oct. 31, 2006

(54) TOOLHEAD FOR MULTI-AXIS MACHINE TOOLS

(75) Inventors: Maurizio Ferrari, Pizzighettone (IT); Bruno Schiavi, Piacenza (IT)

(73) Assignee: Jobs S.p.A., Piacenza (IT)

( * ) Notice: Subject to any disclaimer, the term of this patent is extended or adjusted under 35 U.S.C. 154(b) by 198 days.

(21) Appl. No.: 10/750,959

(22) Filed: Jan. 5, 2004

(65) Prior Publication Data
US 2004/0151556 A1    Aug. 5, 2004

(30) Foreign Application Priority Data
Jan. 31, 2003  (IT) ............................ BO2003A0043

(51) Int. Cl.
*B23C 1/00* (2006.01)
(52) U.S. Cl. .................. 409/201; 409/231; 408/1 R; 408/16; 408/95
(58) Field of Classification Search ............... 409/201, 409/137, 218, 210, 204, 207, 214, 234, 241; 29/26 A; 408/1 R, 16, 3, 13, 8, 14, 51, 98, 408/97, 100, 10, 116
See application file for complete search history.

(56) References Cited

U.S. PATENT DOCUMENTS

| | | | |
|---|---|---|---|
| 4,530,625 A |  | 7/1985 | Corley et al. |
| 4,717,291 A | * | 1/1988 | Zafir ........................... 408/13 |
| 4,869,626 A | * | 9/1989 | Kosmowski ................. 408/129 |
| 5,094,574 A | * | 3/1992 | Nishigai et al. ............. 409/218 |
| 5,123,789 A |  | 6/1992 | Ohtani et al. |
| 5,161,921 A |  | 11/1992 | Corsi |
| 5,263,236 A | * | 11/1993 | Givler ........................ 29/26 A |
| 5,848,859 A | * | 12/1998 | Clark et al. ................. 408/1 R |
| 6,264,590 B1 | * | 7/2001 | Ferrari ........................ 409/137 |
| 2001/0018861 A1 | * | 9/2001 | Glasson ...................... 92/5 R |
| 2001/0021338 A1 |  | 9/2001 | Mitsuzono et al. |

FOREIGN PATENT DOCUMENTS

IT     1220732     6/1990

OTHER PUBLICATIONS

European Search Report dated May 17, 2004.

* cited by examiner

*Primary Examiner*—Monica Carter
*Assistant Examiner*—Dana Ross
(74) *Attorney, Agent, or Firm*—Timothy J. Klima

(57) ABSTRACT

A toolhead intended for a multi-axis machine tool incorporates a tool-holder rotatable about the tool axis and attached to the spindle of a spindlehead, also a stop cage element mounted slidably to the tool-holder, which is furnished with a collar presenting an active surface set transversely to the tool axis and offered to the surface of a workpiece. The stop cage element alternates between a first operating position in which the active surface of the collar is located forward of a countersink portion presented by the tool, considered in relation to the feed direction of the spindlehead as it approaches the surface of the work, and a second operating position in which the countersink portion will be located forward of the active surface, at least in part. The axial position of the stop cage element relative to the tool-holder is monitored continuously by a sensing system.

12 Claims, 3 Drawing Sheets

TOOLHEAD FOR MULTI-AXIS MACHINE TOOLS

BACKGROUND OF THE INVENTION

The present invention relates to a toolhead for multi-axis machine tools.

The invention finds application in systems able to perform drilling, countersinking or other such machining operations automatically and to extremely close tolerances, in situations where the exact height of the machined surface is not known.

In particular, whilst implying no limitation of its general scope, the invention can be associated to advantage with numerically controlled multi-axis machine tools as used especially in the aircraft industry for drilling and countersinking holes in the outer panels of wing structures and fuselage sections, in readiness for the insertion of rivets. In practice, the heads of the inserted rivets must remain perfectly flush with the outer skin of the aircraft in order to ensure they will not generate turbulence, which would occasion a marked increase in aerodynamic resistance.

The prior art embraces devices able to control drilling or countersinking depth, which are set up by performing a mechanical adjustment before each machining job.

Patent IT 1220732, in particular, discloses a depth-controlled drilling and countersinking device able to operate on surfaces positioned at any given height relative to the feed direction of the tool. The device in question comprises a tool-holder with a shank that can be attached to the spindle of a machine tool, also a stop cage mechanism associated with the tool-holder by way of a pair of bearings and presenting a pair of cylinders with piston rods that project from both ends. Each of the rods is connected at one end to a collar, through which the tool is insertable when penetrating the work, and at the opposite end to a mounting plate. The collar is translatable relative to the tool-holder, in a direction parallel to the tool axis. The mounting plate associated with the ends of the rods remote from the tool carries respective micrometer screws that can be locked fast in a selected position by means of stops. Two microswitches are fixed to the spindlehead, their axes coinciding with those of the two micrometer screws. The microswitches are also connected to suitable devices serving to pilot the tool feed movement of the spindle. To control the depth of the countersink, the position of the screws is adjusted in such a way that the distance between the tip of the screw and the corresponding microswitch is equal to the distance between the face of the collar and the tool, plus the depth of the countersink. During operation, the spindle of the machine continues to advance until the screws engage and trip the microswitches. At this point, the devices piloting the movement of the spindle will be caused by the resulting contact to retract the tool. The machining depth is thus mechanically controlled, and the switches serve simply to halt the movement of the spindle once the prescribed depth has been reached.

The applicant finds that prior art devices of the type outlined above could be improved from various standpoints.

More exactly, mechanically controlled devices of familiar type such as the one described above do not allow any automatic adjustment of the depth to which the tool is sunk during the work cycle.

In practice however, an adjustment of this kind becomes necessary given that, whilst the shanks of the rivets utilized are generally identical, the dimensions of the respective heads will often vary. Accordingly, the single tool by which the hole is first drilled and then countersunk must penetrate to different depths according to the size of the rivet head that will ultimately occupy the hole. Furthermore, it may be that the cycle will involve sinking all of the holes initially, with different diameters one from another, and then countersinking each one in turn with a single tool penetrating to different depths as determined by the diameters of the different holes.

To this end, when using devices of the prior art type, the machine must always be stopped so as to allow manual adjustment of the micrometer screws.

The object of the present invention is to resolve the problems encountered with prior art solutions by setting forth a toolhead for multi-axis machine tools that will allow of sinking and countersinking holes automatically to different depths without any mechanical adjustment of the tool being required.

A further object of the invention is to provide a toolhead for multi-axis machine tools designed so as to allow a reduction of the down times between machining cycles, thereby optimizing production.

SUMMARY OF THE INVENTION

The stated object is realized according to the present invention in a toolhead for multi-axis machine tools comprising a tool-holder rotatable about a relative tool axis, equipped with a collet in which to hold a tool and attachable to the spindle of a spindlehead in a multi-axis machine tool, also a stop cage element slidable axially relative to the tool-holder and affording an active surface transverse to the tool axis, positionable against the surface of a workpiece.

The stop cage element is capable of movement between a first operating position in which the active surface is located forward of a cutting portion presented by the tool, relative to a feed direction along which the spindlehead approaches the surface of the work, and a second operating position in which the cutting portion of the tool is located forward of the active surface, at least in part.

To advantage, the toolhead also comprises sensing means of which the function is to monitor the axial position of the stop cage element, continuously, relative to the tool-holder.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
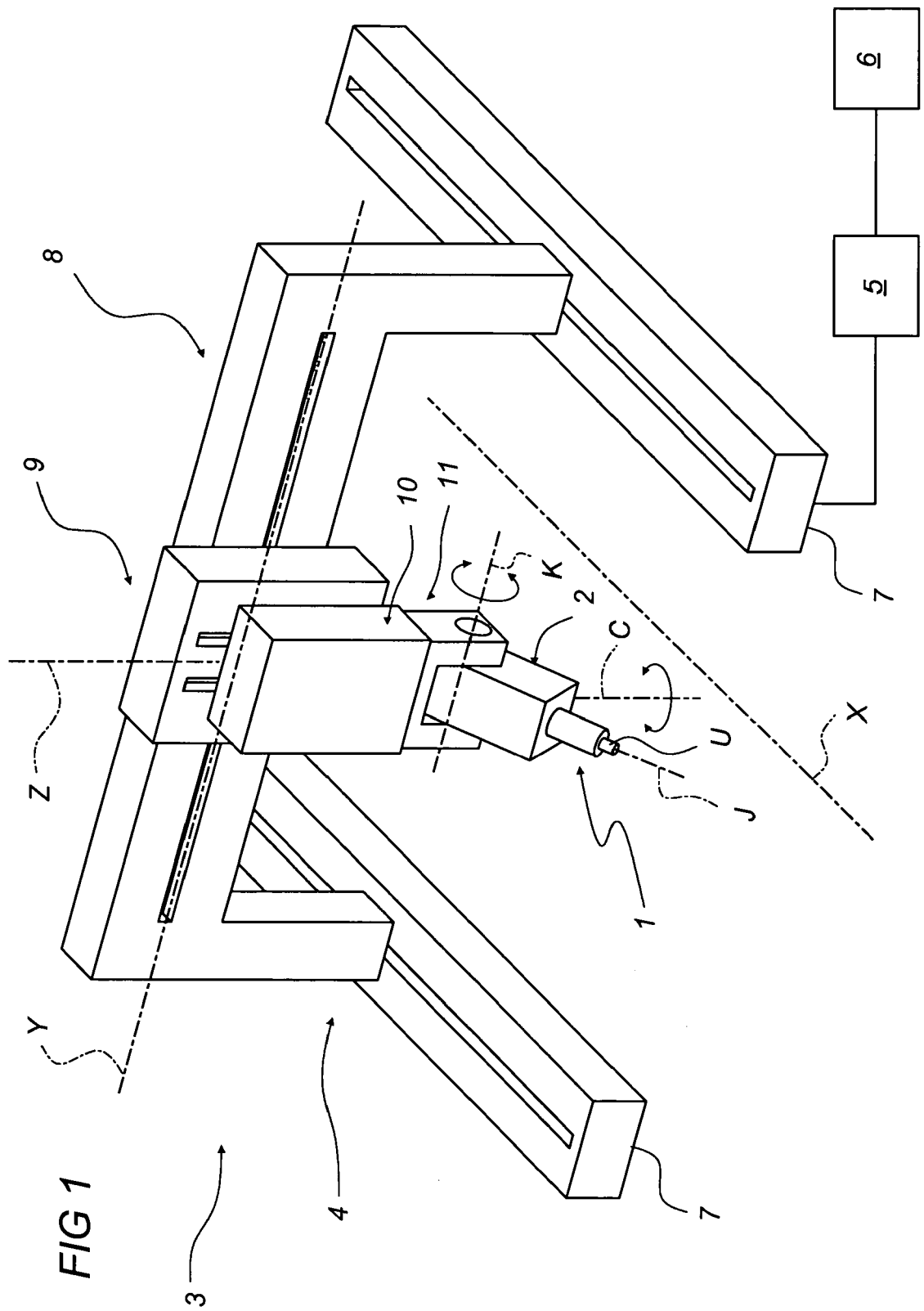
FIG. 1 illustrates a multi-axis machine tool equipped with a toolhead according to the present invention, viewed in perspective.

Referring to the accompanying drawings, 1 denotes a toolhead according to the present invention, in its entirety. The toolhead 1 is mounted to the spindlehead 2 of a numerically controlled multi-axis machine tool 3.

In general terms, the machine tool 3 comprises a bed 4 on which the spindlehead 2 is mounted with freedom of movement, relative to the bed 4, along a plurality of positioning axes. The spindlehead 2 is positioned on the various axes by drive means 5 of conventional embodiment (not described further), connected to a processing and control unit 6 and serving also to govern the rotation of the tool U about a relative machining axis J on the basis of data programmed into the control unit 6.

By way purely of example, the machine tool 3 shown schematically in FIG. 1 has five axes X, Y, Z, C and A with linear motors, and is designed to drill and countersink holes in parts of appreciable dimensions such as the panels and ribs of aircraft wings.

More specifically, the bed 4 of the machine 3 comprises two parallel slide ways 7 extending along a first positioning axis X, between which the work will be placed, and is surmounted by a gantry 8 traversable along the slide ways 7. The gantry 8 carries a first cross slide 9 traversable along the beam of the gantry 8, which coincides with a second positioning axis Y orthogonal to the first axis X and parallel to the floor. A second cross slide 10 mounted to the first slide 9 is traversable along a third positioning axis Z, extending perpendicular to the floor, and carries a rotary unit 11 at the bottom end centered on a fourth axis C parallel to the third axis Z. The spindlehead 2 is mounted to the rotary unit 11 and pivotable also about a fifth axis A orthogonal to the fourth axis C.

Figure 2:
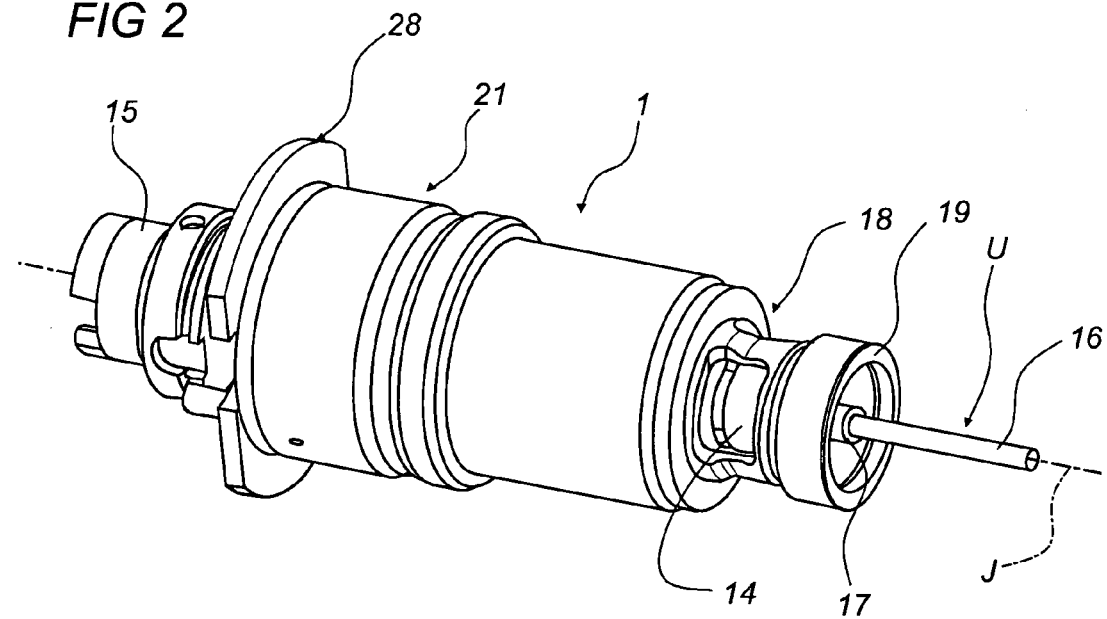
FIG. 2 is an enlarged perspective view of the toolhead shown in FIG. 1.
Figure 3:
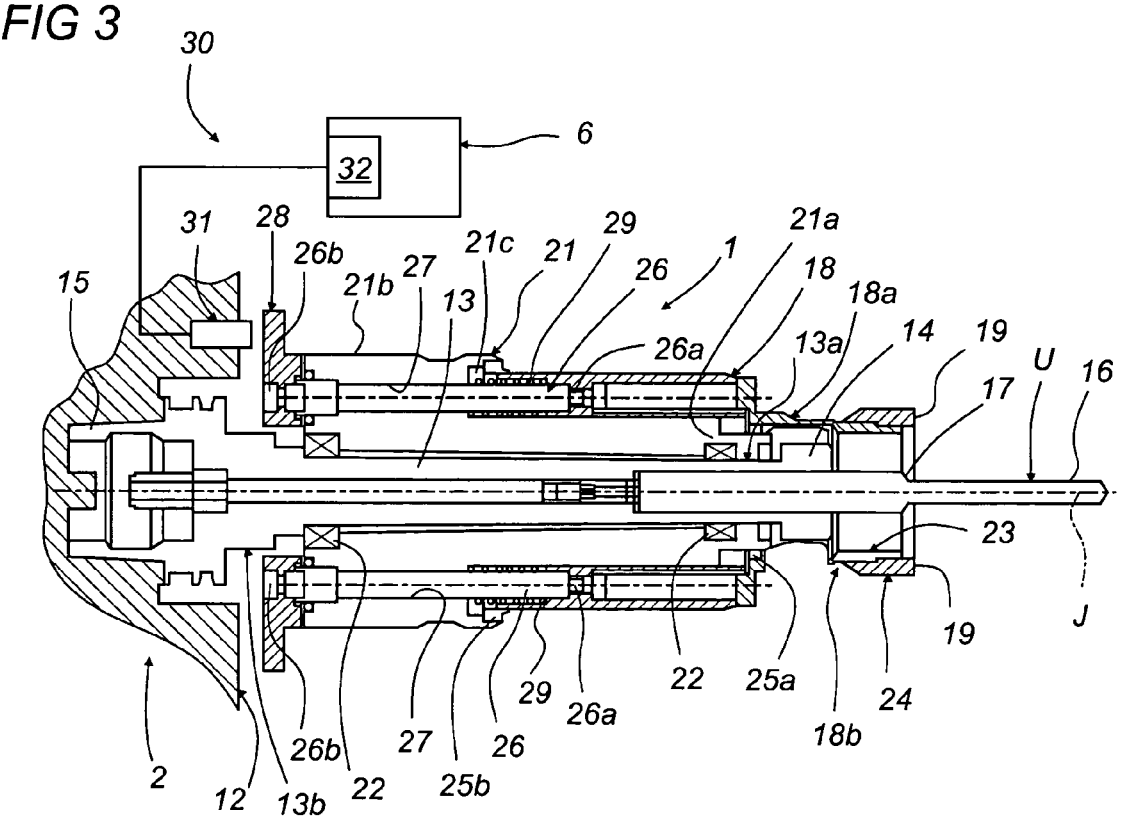
FIG. 3 is a sectional side elevation showing the toolhead of FIG. 2 attached to the spindle of the multi-axis machine.

Referring to FIGS. 2 and 3, the toolhead 1 is coupled to a spindle 12 in the spindlehead 2. More exactly, the toolhead 1 comprises a tool-holder 13 appearing as a cylindrical body centered on the machining axis J, of which one end 13a presents a spring collet 14 gripping the tool U, and the other end 13b presents a shank 15 that can be attached to the spindle 12 (indicated schematically).

The tool-holder 13 and the tool U are caused to rotate as one about the machining axis J, relative to the spindlehead 2, whilst the tool-holder 13 and the spindlehead 2 are rigidly associated one with another when moving along this same axis J.

The tool U shown in the accompanying drawings is furnished with a drill bit 16, and with a cutting portion 17 obtained by widening the shaft of the tool U so as to create a frustoconical surface that will countersink the hole drilled by the bit 16.

In an alternative solution, the tool U might be one comprising the conical countersink portion 17 only.

Figure 4A:
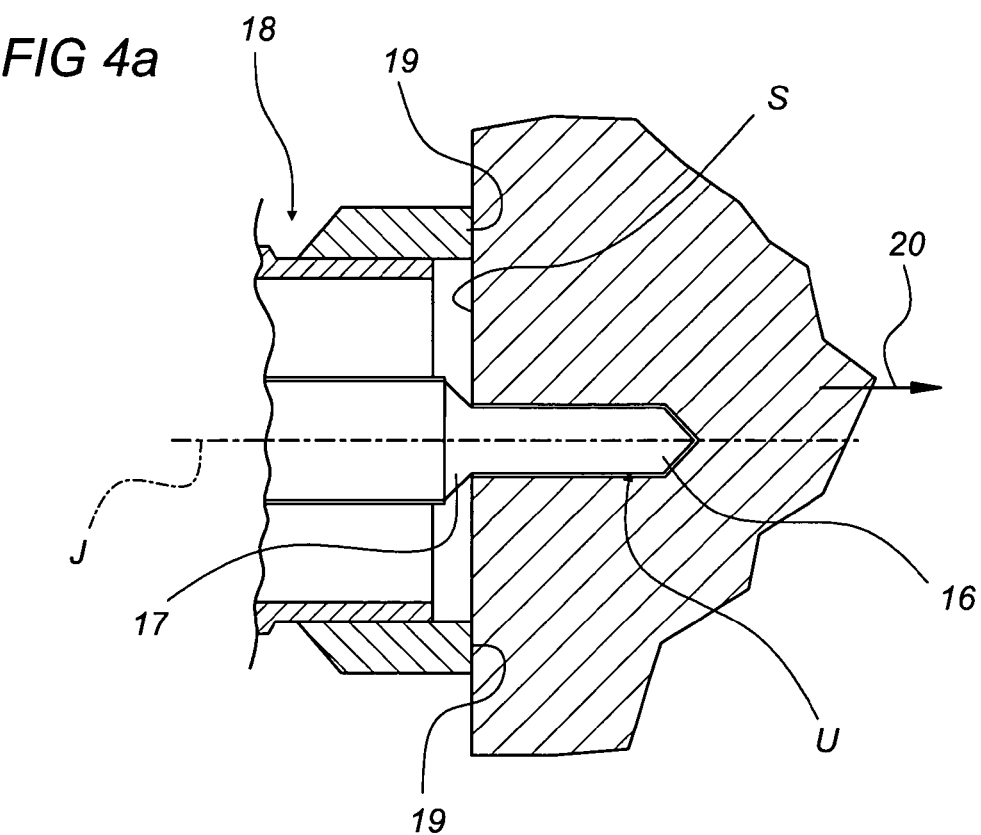
FIGS. 4a and 4b show an enlarged detail of the toolhead in FIG. 2, illustrated during respective steps of operation.
Figure 4B:
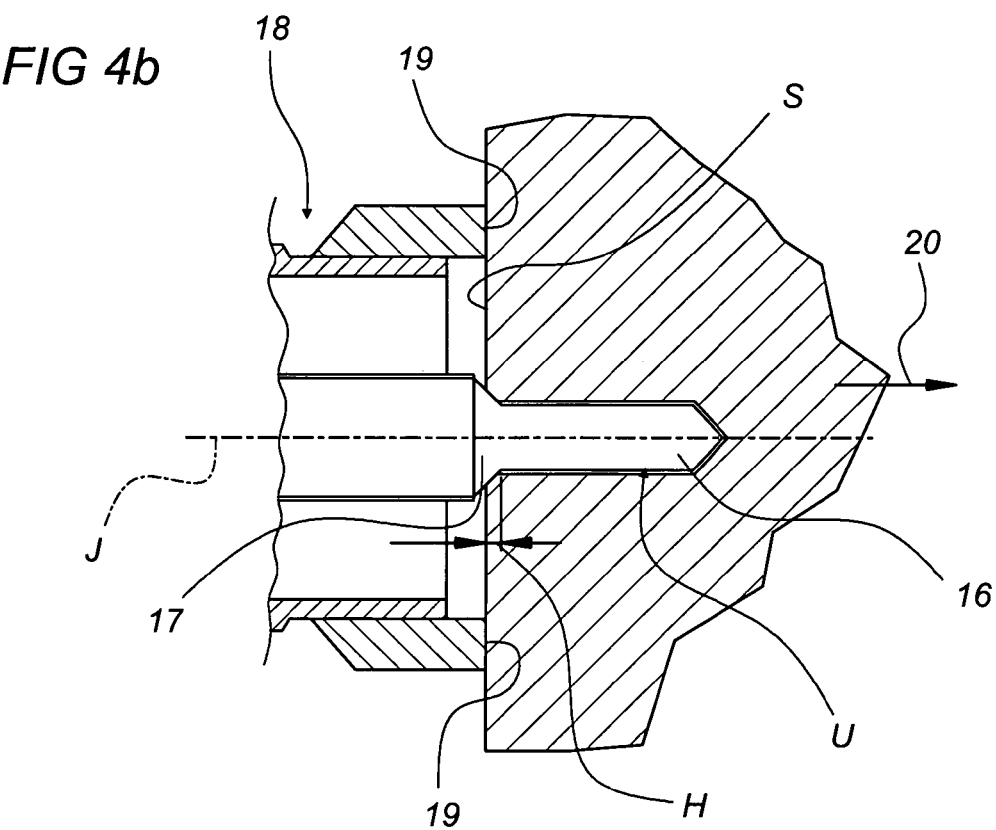

The toolhead 1 comprises a stop cage element 18 capable of sliding axially in relation to the tool-holder 13, and therefore to the spindlehead 2. The stop cage element 18 presents an active surface 19 disposed transverse to the machining axis J, such as can be offered in contact to a machinable work surface S (FIGS. 4a and 4b). In the preferred embodiment of the drawings, the active surface 19 encircles the tool U circumferentially (FIG. 2).

The stop cage element 18 is capable of movement between a first operating position, in which the active surface 19 is located forward of the cutting portion 17 presented by the tool U, considered in the direction 20 along which the spindlehead 2 approaches the work surface S (FIG. 4a), and a second operating position in which the cutting portion 17 of the tool is located forward of the active surface 19, at least in part, as part of a work cycle to be described in due course.

In more detail, structurally, the toolhead 1 also incorporates an auxiliary housing 21 encasing the tool-holder 13 and presenting a first portion 21a adjacent to the spring collet 14, also a second portion 21b, adjacent to the shank 15, of which the diameter is greater than the diameter of the first portion 21a (FIG. 3).

The auxiliary housing 21 is mounted rotatably to the tool-holder 13 by way of a pair of bearings 22, while constrained to move as one with the selfsame tool-holder 13 along the direction of the machining axis J. The stop cage element 18 in turn is mounted slidably to the auxiliary housing 21.

More exactly, the stop cage element 18 presents a first cylindrical portion 18a ensheathing the first portion 21a of the housing 21, on which it is also slidable parallel to the machining axis J.

A second cylindrical portion 18b of the stop cage element 18 is joined coaxially and rigidly to the first portion 18a and extends beyond the collet 14 to a point of proximity with the cutting portion 17 of the tool U. One end 23 of the second cylindrical portion 18b of the stop cage element 18, the end nearer to the cutting portion 17, presents a thread engaged by a micrometer screw collar 24 affording the active surface 19.

A first circular seal 25a is positioned between the second cylindrical portion 18b of the stop cage element 18 and the auxiliary housing 21.

The stop cage element 18 is also connected to the auxiliary housing 21 by way of a pair of rods 26 accommodated slidably within the housing 21.

In particular, the rods 26 are anchored to the first cylindrical portion 18a of the stop cage element 18 and extend parallel with the machining axis J toward the shank 15 of the tool-holder 13, passing through passages 27 created especially in the second portion 21b of the auxiliary housing 21. A first end 26a of each rod 26 is inserted stably into the first cylindrical portion 18a of the stop cage element 18, whilst the second end 26b of the rod 26 projects from the second portion 21b of the auxiliary housing 21, facing the spindlehead 2. The second ends 26b of the two rods 26 are anchored to a plate 28 encircling the tool-holder 13.

The toolhead 1 further comprises spring means 29 operating between the stop cage element 18 and the auxiliary housing 21, in such a manner as to bias the selfsame stop cage element 18 toward the first operating position.

In the example illustrated, such spring means 29 are embodied as two coil springs, each ensheathing a respective rod 26 with one end seated against the stop cage element 18 and the opposite end seated against the auxiliary housing 21.

The mechanical structure of the toolhead 1 as described thus far is designed in such a way that the stop cage element 18 and the assembly composed of the tool-holder 13 and the auxiliary housing 21 are allowed freedom of relative movement, parallel to the machining axis J, between two travel limit positions compassing the first and second operating positions.

As long as the active surface 19 is not directed against any work surface S, the toolhead 1 will be kept in the first limit position by the action of the coil springs 29. In this situation the plate 28 is positioned tight against the second portion 21b of the auxiliary housing 21.

In the second limit position, the stop cage element 18 is forced against a shoulder 21c located at the junction between the first portion 21a and the second portion 21b of the auxiliary housing 21. The space adjacent to the shoulder 21c is occupied by a second circular seal 25b, positioned between the first cylindrical portion 18a of the stop cage element 18 and the auxiliary housing 21.

Advantageously, the toolhead 1 further comprises sensing means 30 able to monitor the axial position of the stop cage element 18, continuously, relative to the tool-holder 13.

Likewise advantageously, the sensing means 30 of the toolhead 1 are connected to the processing and control unit 6 of the machine tool 3 in such a way as will allow the axial feed of the spindlehead 2 to be interlocked to the countersink depth value programmed in the selfsame control unit 6.

The aforementioned sensing means 30 comprise at least one displacement sensor 31 connected to a processing unit 32 interfaced or integrated with the main control unit 6. In effect, the electronics needed to handle the signal from the sensor 31 can be either incorporated into the main control unit 6 or procured as a separate unit 32 installed between the sensor 31 and the control unit 6.

The sensor 31 is required to detect a relative displacement of the stop cage element 18 and the tool-holder 13. Given that the tool-holder 13 moves as one with the spindlehead 2 along the machining axis J, the sensor 31 will be positioned preferably so as to detect a relative displacement between the stop cage element 18 and the spindlehead 2.

The sensor 31 can be of any given type as long as it is able to produce an output signal proportional to the relative displacement between the components in question.

In a preferred first embodiment of the present invention, the displacement sensor 31 would be a Linear Variable Differential Transformer or "LVDT" transducer of familiar type, mounted between the spindlehead 2 and the stop cage element 18. For example, the cylinder of the LVDT transducer could be anchored to the spindlehead 2 and the plunger rod offered to the plate 28 associated with the stop cage element 18.

In a second embodiment of the present invention, the displacement sensor 31 might be a measuring probe mounted in exactly the same way as the LVDT transducer.

Alternatively, and in a third possible embodiment of the invention, the displacement sensor 31 could be an inductive transducer operating between the spindlehead 2 and the stop cage element 18. By way of example, as indicated in FIG. 3, the inductive transducer 31 could be mounted to the spindlehead 2 and directed at the plate 28 associated with the stop cage element 18, the plate 28 in this instance being necessarily metallic.

Finally, in a fourth embodiment, the displacement sensor 31 could take the form of a laser device operating between the spindlehead 2 and the stop cage element 18. Likewise in this instance, the laser device would be mounted preferably to the spindlehead 2 and directed toward the plate 28 associated with the stop cage element 18.

Following a description concerned thus far with predominantly structural aspects, the operation of a machine tool equipped with a toolhead according to the present invention will now be described, and in particular the single operation of drilling and countersinking a hole.

The processing and control unit 6 is programmed to drill and to countersink a given number of holes on a known nominal surface, each countersunk to a predetermined depth H.

A tool U of the type illustrated is fitted to the tool-holder 13, and the position of the micrometer collar 24 adjusted, if necessary, relative to the frustoconical cutting portion 17 that will form the countersink, in such a way as to bring the leading edge of the selfsame frustoconical portion 17 into alignment with the active surface 19. The position in question can be checked with extreme precision, for example with the aid of scanning means.

The machine 3 begins its automatic work cycle, drilling a hole in the surface S by advancing the spindlehead 2 toward the work. During the course of the approach, the tip P of the tool penetrates the work while the stop cage element 18 is kept in the first limit position through the action of the coil springs 29; as the active surface 19 is still not in contact with the work surface S at this stage, the sensor 31 registers a constant distance, or in other words, zero displacement.

When the active surface 19 enters into contact with the work surface S (FIG. 4a), the tool U and the spindlehead 2 continue to advance, whereas the stop cage element 18 remains stationary relative to the work.

The control unit measures the displacement of the stop cage element 18 relative to the spindlehead 2, which corresponds in practice to the penetration of the frustoconical cutting portion 17 and therefore to the depth of the countersink H (FIG. 4b). Once the penetration of the tool matches the programmed depth value H, the control unit generates a command to retract the spindlehead 2 and tool U and start another cycle.

The tool used on the machine could be different from that illustrated, consisting for example in a countersink only or a drill bit only. The tip of the tool will in any event occupy the position as indicated for the cutting portion 17 in the example of the drawings, substantially in alignment with the active surface 19.

The objects stated at the outset are realized by the present invention, and the problems associated with the prior art duly overcome.

First and foremost, a toolhead for multi-axis machine tools according to the present invention guarantees precise and continuous control of the machining depth at every step of the process, even when machining surfaces of which the height from datum is not known exactly.

In addition, the toolhead disclosed can be used to perform machining operations at different depths without the need to stop the machine and adjust the position of the tool relative to given parts of the head. In effect, the machining depth is programmed and managed by way of the machine controller before the cycle commences.

Finally, it will be observed that the advantages mentioned above are accompanied by the benefits of reduced down time between machining cycles, and therefore of optimized production.

What is claimed is:

1. A toolhead for multi-axis machine tools, comprising:
a tool-holder rotatable about a respective machining axis, equipped with a collet in which to hold a tool, and attachable to the spindle of a spindlehead in a multi-axis machine tool;
a stop cage element slidable axially relative to the tool-holder, affording an active surface set transverse to the machining axis and positionable against the surface of a workpiece, capable of movement between a first operating position in which the active surface is located forward of a cutting portion presented by the tool, relative to a feed direction along which the spindlehead approaches the surface of the work, and a second operating position in which the cutting portion of the tool is located forward of the active surface, at least in part,
sensing means by which the axial position of the stop cage element relative to the tool-holder is monitored continuously,
an auxiliary housing mounted rotatably to the tool-holder and associated rigidly with said tool-holder in the axial direction, wherein the stop cage element is mounted slideably to the auxiliary housing.

2. A toolhead as in claim 1, wherein the sensing means comprise at least one displacement sensor connected to a processing unit.

3. A toolhead as in claim 2, wherein the displacement sensor is an LVDT transducer.

4. A toolhead as in claim 3, wherein the LVDT transducer is mounted between the spindlehead and the stop cage element.

5. A toolhead as in claim 2, wherein the displacement sensor is a measuring probe.

6. A toolhead as in claim 5, wherein the measuring probe is mounted between the spindlehead and the stop cage element.

7. A toolhead as in claim 2, wherein the displacement sensor is an inductive transducer.

8. A toolhead as in claim 7, wherein the Inductive transducer is mounted between the spindlehead and the stop cage element.

9. A toolhead as in claim 2, wherein the displacement sensor is a laser displacement sensor.

10. A toolhead as in claim 9, wherein the laser displacement sensor is mounted between the spindlehead and the stop cage element.

11. A toolhead as in claim 1, wherein the stop cage element is mounted to the auxiliary housing by way of a pair of rods accommodated slideably within said auxiliary housing.

12. A toolhead as in claim 1, further comprising spring means operating between the stop cage element and the auxiliary housing, by means of which the stop cage element is biased toward the first operating position.

* * * * *